(12) United States Patent
Del Puerto

(10) Patent No.: US 12,740,668 B2
(45) Date of Patent: Sep. 22, 2026

(54) CONDENSATION REMOVER SELF STANDING PAN LID

(71) Applicant: EZ BROS LLC, Sherman Oaks, CA (US)

(72) Inventor: Arturo Perez Del Puerto, Los Angeles, CA (US)

(73) Assignee: EZ BROS LLC, Sherman Oaks, CA (US)

( * ) Notice: Subject to any disclaimer, the term of this patent is extended or adjusted under 35 U.S.C. 154(b) by 78 days.

(21) Appl. No.: 18/740,268

(22) Filed: Jun. 11, 2024

(65) Prior Publication Data

US 2024/0407593 A1 Dec. 12, 2024

Related U.S. Application Data

(60) Provisional application No. 63/507,723, filed on Jun. 12, 2023.

(51) Int. Cl.

| | |
|---|---|
| ***A47J 47/16*** | (2006.01) |
| ***A47J 36/04*** | (2006.01) |
| ***A47J 36/06*** | (2006.01) |
| ***A47J 36/38*** | (2006.01) |
| ***A47J 45/06*** | (2006.01) |

(52) U.S. Cl.

CPC ............... *A47J 36/06* (2013.01); *A47J 36/04* (2013.01); *A47J 36/064* (2022.01); *A47J 36/38* (2013.01); *A47J 45/063* (2013.01); *A47J 47/16* (2013.01)

(58) Field of Classification Search

CPC .. A47J 36/06; A47J 36/08; A47J 36/12; A47J 45/063; A47J 4/16; B65D 47/40; B65D 51/242

See application file for complete search history.

(56) References Cited

U.S. PATENT DOCUMENTS

| | | | | |
|---|---|---|---|---|
| 10,905,227 B2 * | 2/2021 | Carnevali | ................. | A45F 5/10 |
| 2005/0205577 A1 * | 9/2005 | Park | ........................ | A47J 27/56 220/756 |
| 2012/0080430 A1 * | 4/2012 | Hoff | ........................ | A47J 36/38 220/212 |
| 2019/0021537 A1 * | 1/2019 | Park | ........................ | A47J 27/09 |

* cited by examiner

*Primary Examiner* — Andrew T Kirsch

(74) *Attorney, Agent, or Firm* — Hunton Andrews Kurth LLP

(57) ABSTRACT

The present invention relates to a condensation remover self-standing pan lid. The lid includes a lid cover unit, a collection and disposal unit, a lid holder unit, and a self-supporting unit. The lid cover unit is designed to fit securely on top of a pan, preventing condensation from escaping. The collection and disposal unit collects the condensed liquid and provides a means for easy disposal. The lid holder unit allows the lid to be conveniently stored when not in use. The self-supporting unit ensures stability and prevents the lid from tipping over. This innovative self-standing pan lid provides an efficient and practical solution for removing condensation during cooking, enhancing the overall cooking experience.

18 Claims, 16 Drawing Sheets

CONDENSATION REMOVER SELF STANDING PAN LID

CROSS REFERENCE TO RELATED APPLICATION

This application claims a priority of Provisional U.S. Patent Application No. 63/507,723 filed Jun. 12, 2023, the complete disclosure of which is incorporated herein by reference in its entirety.

FIELD OF THE INVENTION

The present disclosure relates generally to pan lid, and more particularly, to a condensation remover self-standing pan lid.

BACKGROUND

Pan lids are used to cover pans, such as saucepans, frying pans, pots and casseroles, (hereinafter pans.) Previous pan lids have typically focused on providing a means to prevent condensation from forming on the lid. These approaches have included various designs such as vented lids. While these designs have been somewhat effective in reducing condensation buildup, they have not provided a comprehensive solution for effectively removing and disposing of the condensed liquid.

These and other deficiencies exist. Accordingly, there is a need for pan lids that can overcome these deficiencies and provide a convenient and efficient solution for managing condensation during cooking.

SUMMARY

Embodiments of the present disclosure provide a condensation remover self-standing pan lid. The condensation remover self-standing pan lid includes: a lid cover unit; a collection and disposal unit coupled to the lid cover unit; a lid holder unit coupled to the lid cover unit; and an upright support unit coupled to the lid cover unit.

Embodiments of the present disclosure provide a cooking apparatus. The cooking apparatus includes a pan and a condensation remover self-standing pan lid fitting securely on top of the pan. The condensation remover self-standing pan lid includes: a lid cover unit; a collection and disposal unit coupled to the lid cover unit; a lid holder unit coupled to the lid cover unit; and an upright support unit coupled to the lid cover unit.

Further features of the disclosed pan lid and cooking apparatus, and the advantages offered thereby, are explained in greater detail hereinafter with reference to specific example embodiments illustrated in the accompanying drawings.

DETAILED DESCRIPTION OF EXAMPLE EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The described features and teachings of the embodiments may be combined in any suitable manner. A person of ordinary skill in the art will recognize that the embodiments may be practiced without one or more of the specific features and teachings of an embodiment. In other instances, additional features and teachings may be recognized in certain embodiments that may not be present in all embodiments. A person of ordinary skill in the art will understand that the described features and teachings of any embodiment can be interchangeably combined with the features and teachings of any other embodiment.

The present disclosure provides a condensation remover self-standing pan lid (also referred to as a condensation remover upright lid (CRUL)) and a cooking apparatus including the self-standing pan lid. The disclosed pan lid and cooking apparatus can eliminate drip on kitchen countertop. A unique design of the pan lid that, when removed from a pan while cooking, collects on its lower internal edge condensation from the internal face of the pan lid and prevents the collected condensation from dripping onto the kitchen countertop. The disclosed pan lid and cooking apparatus can also provide upright or self-standing capability. A unique design of a self-standing device (SSD), incorporated into the external face of the pan lid, which, when released from its stowed position, allows the pan lid to sit firmly on the kitchen countertop without spilling the collected condensation.

Figure 1:
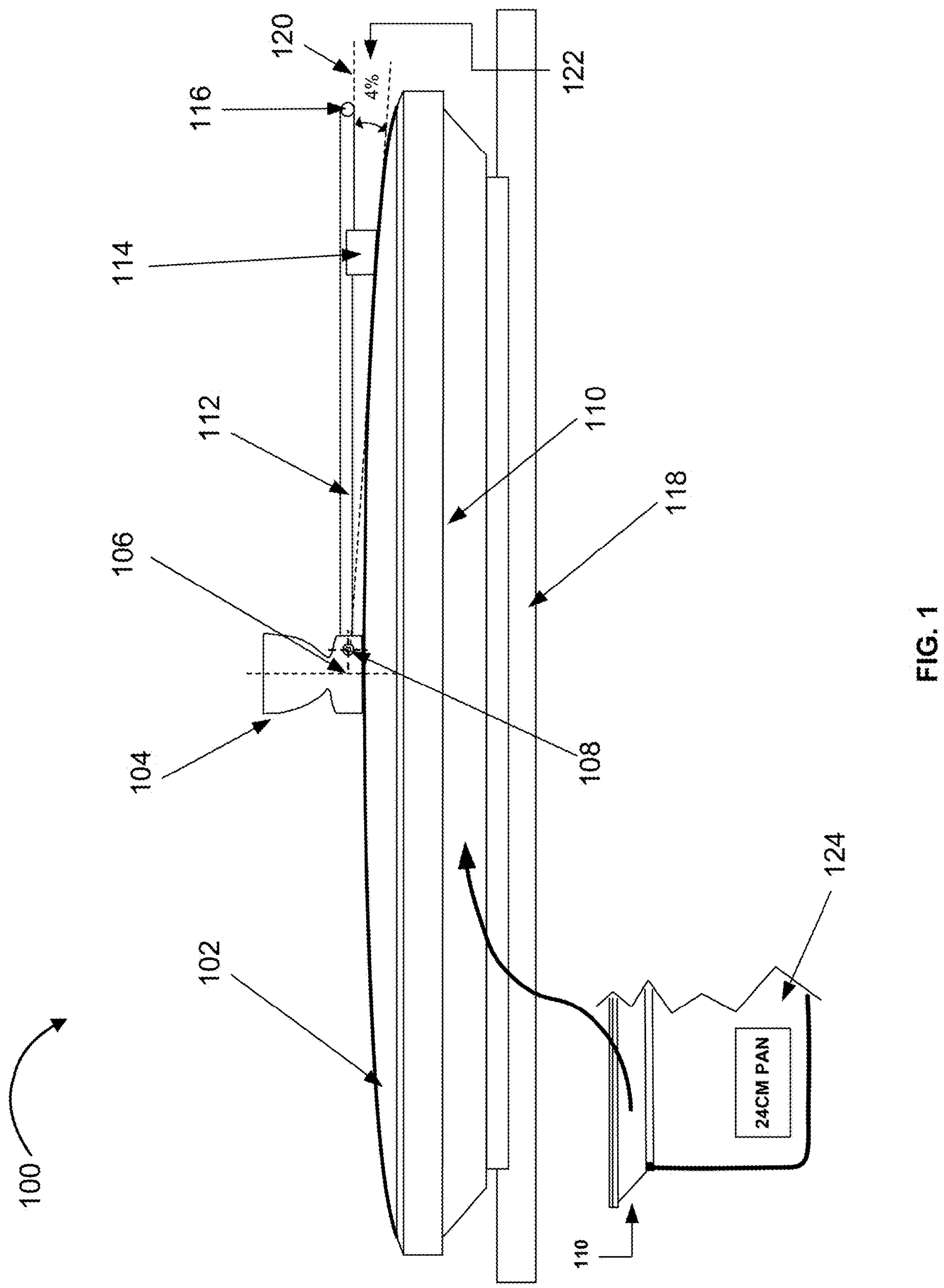
FIG. 1 illustrates various components of a pan lid according to an example embodiment.

FIG. 1 illustrates various components of a pan lid 100 according to an example embodiment. As shown in FIG. 1, the pan lid 100 can include a lid cover unit (LCU) 102, a lid holding unit (LHU) 104, a SSD hinge assembly unit (HAU) 106, an axle pin unit (APU) 108, a condensation disposal unit (CDU) 110, a SSD support leg unit (SLU) 112, a SSD leg retainer unit (LRU) 114, and a SSD anti-roll unit (ARU) 116. The pan lid 100 is shown to be placed on a countertop 118. As shown by a dotted line 120 in FIG. 1, the SLU 112 is parallel to the countertop 118. Further, as shown by 122, the LCU 102 may have a curvature top limit of about 4% measured from the dotted line 120. Also as shown partially in FIG. 1, the pan lid 100 can engage a pan 124 of about 24 cm diameter.

Figure 2:
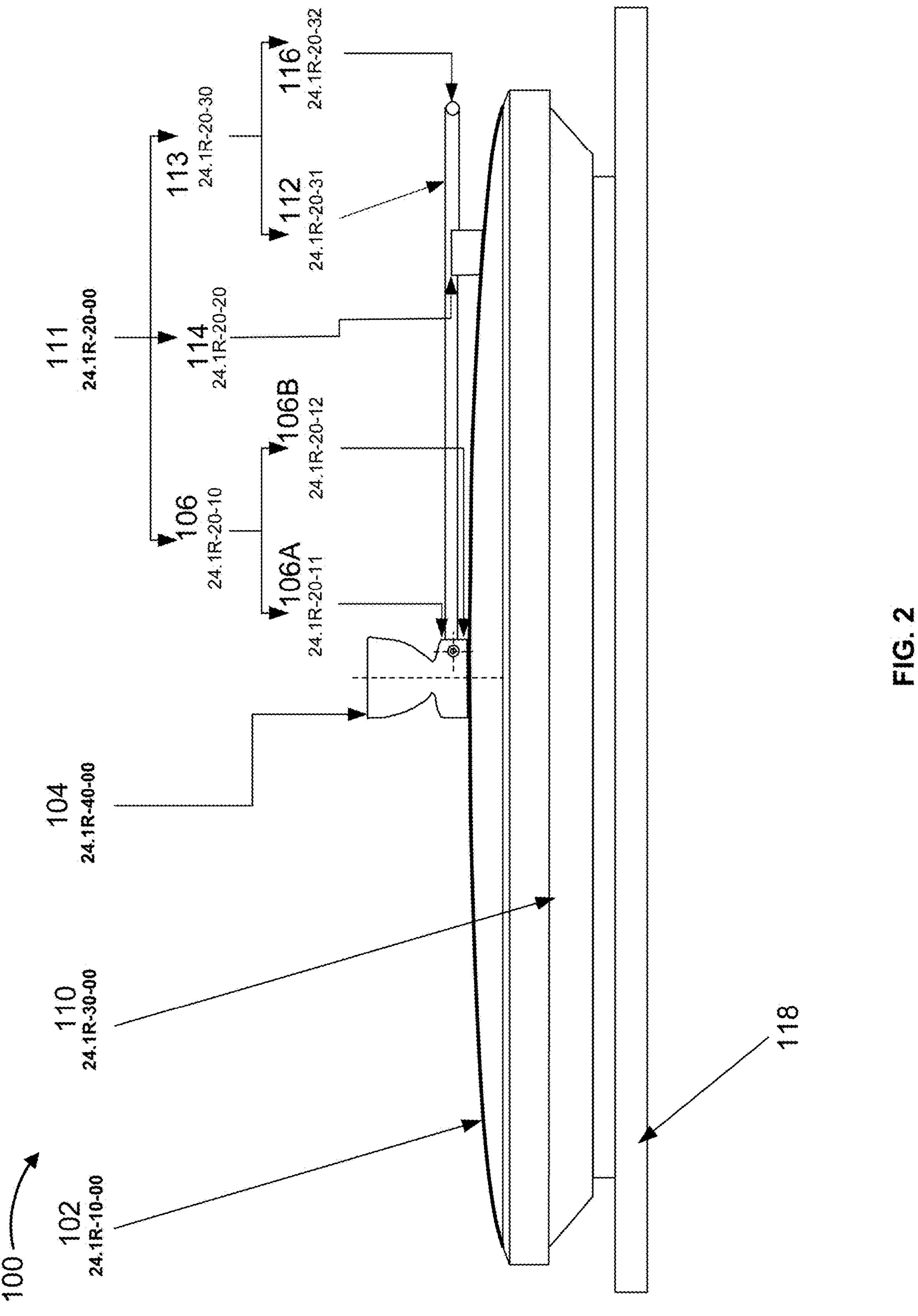
FIG. 2 illustrates details of the various components of the pan lid shown in FIG. 1 according to an example embodiment.

FIG. 2 illustrates details of the various components of the pan lid 100 shown in FIG. 1 according to an example embodiment. The drawings coding system used in FIG. 2 may take a format: NN.NA-NN-NN. The first two Ns in the coding system indicate an inner diameter of a pan or pot that mates with the pan lid 100 (a numerical code expressed in cm. e.g., 24 means the pan lid 100 fits a 24 cm inner diameter pot). The third N in the coding system indicates LCU material (a numerical code, e.g., 1 means tempered glass, 2 means stainless steel, etc.). The letter A in the coding system indicates a specific configuration of the pan lid 100 due to a set of differentiating technical characteristics (an alphabetical code from A to Z, e.g., R means round SSD hinge integrated into LHU). The fourth and fifth Ns in the coding system indicate systems, assemblies, units or groups that constitute the first level of disaggregation of a given pan lid configuration (a numerical code from 00 to 99). The last two Ns in the coding system indicate sub-systems, components, parts or elements that constitute the second level of disaggregation of a given pan lid configuration (a numerical code from 00 to 99).

As shown in FIG. 2, the LCU 102 is assigned a code 24.1R-10-00. The CDU 110 is assigned a code 24.1R-30-00. The LHU 104 is assigned a code 24.1R-40-00. The HAU 106 is assigned a code 24.1R-20-10. The HAU 106 comprises a hinge plate unit (HPU) 106A and a hinge base unit (HBU) 106B. The HPU 106A is assigned a code 24.1R-20-11, and the HBU 106B is assigned a code 24.1R-20-12. The LRU 114 is assigned a code 24.1R-20-20. The SLU 112 is assigned a code 24.1R-20-31. The ARU 116 is assigned a code 24.1R-20-32.

The SLU 112 and the ARU 116 comprise a support leg assembly (SLA) 113 that is assigned a code 24.1R-20-30. The HAU 106, the LRU 114 and the SLA 113 comprise a self-standing device (SSD) 111 that is assigned a code 24.1R-20-00.

Figure 3:
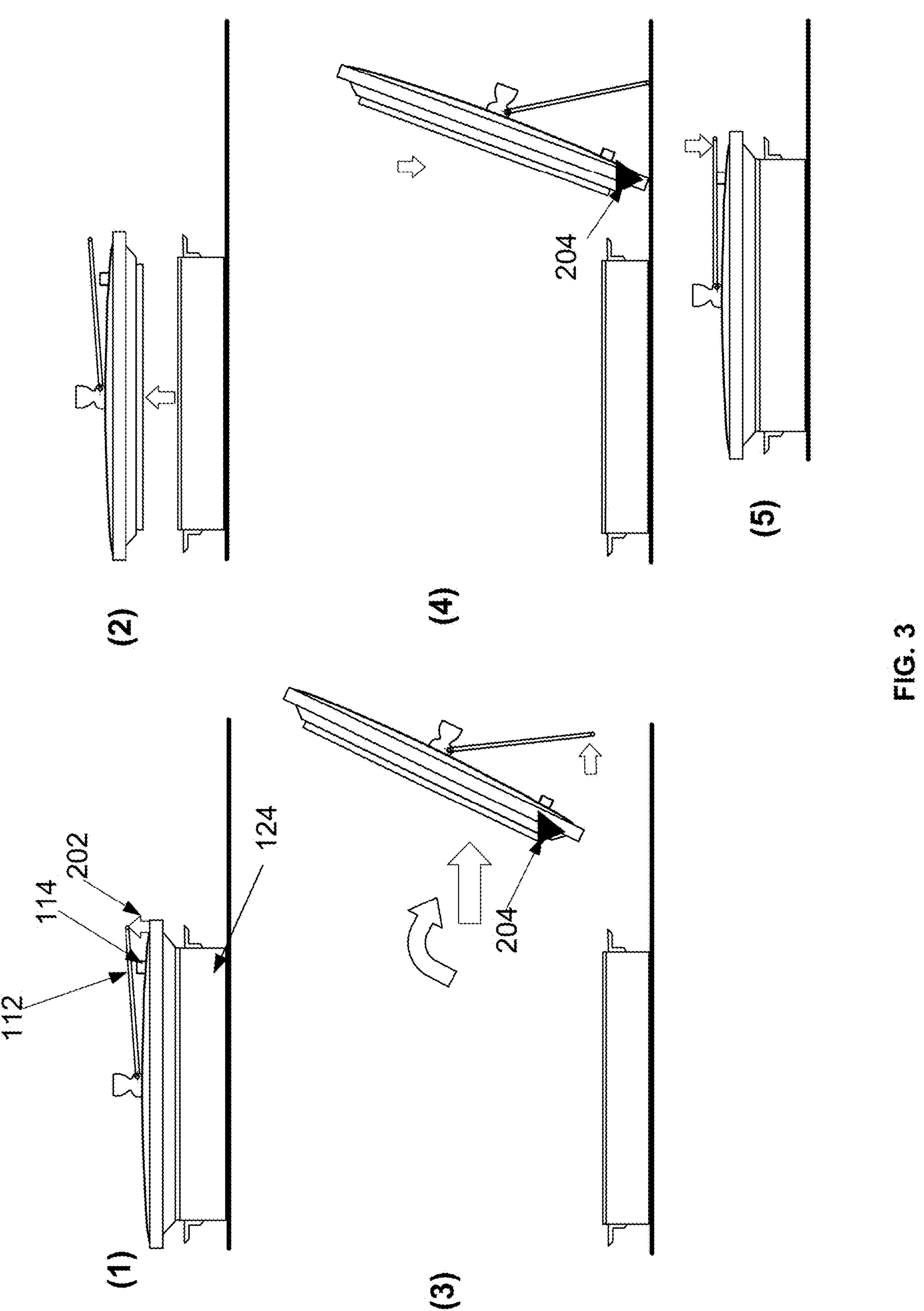
FIG. 3 illustrates a removal sequence of the pan lid shown in FIG. 1 from a pan according to an example embodiment.

FIG. 3 illustrates a removal and placement sequence of the pan lid 100 shown in FIG. 1 from the pan 124. In step (1), the SLU 112 is released from its retainer 114 by gently pulling up from its end as indicated by the arrow 202. In step (2), the pan lid 100 is lifted vertically from the pan 124 around 5 cm and simultaneously proceed as indicated in step (3). In step (3), the pan lid 100 is rotated to the right beyond its vertical position and simultaneously move the pan lid 100 towards the countertop or sink. The SLU 112 will rotate outwards from the pan lid 100 due to gravity. The pan lid collector will collect the liquid 204 condensed inside the pan lid 100, which will flow down due to the action of gravity without overflowing onto the countertop. In step (4), the liquid 204 accumulated in the pan lid 100 is emptied into the sink or place the pan lid 100 on countertop without fear of liquid spilling. In Step (5), if it has not been done previously, the accumulated liquid 204 can be emptied into the sink and proceed in reverse order to place the pan lid 100 on the pan 124. The SLU 112 will automatically fold under the action of gravity until it rests on the retainer 114. Press downwards lightly on the SLU 112 so that it is safely secured by the retainer 114.

Thus, the pan lid 100 can be placed firmly on a kitchen countertop without any condensation spillage. When the pan lid 100 is removed from the pan 124, the SLU 112 is released either automatically or manually from its stowed position. Upon the pan lid 100 being placed on the kitchen countertop, the released SLU 112 can self-stand to support the pan lid 100 substantially upright with respect to the kitchen countertop, which can prevent the collected condensation 204 on a lower internal edge of the pan lid 100 from spilling onto the kitchen countertop.

In one embodiment of cleaning the pan lid 100, it is preferred to remove the plastic parts and the associated stainless steel device from glass lid with the help of a screwdriver. In a container, a splash of liquid detergent and boiled water is placed, and baking soda and white vinegar are added and stirred well. All parts and components of the pan lid 100 are introduced into the container. A wooden spoon is used to move all parts of the pan lid 100 and wait at least four hours. Once the water is cold, a new brush is used with soft bristles to remove any grease accumulated on surfaces and edges. A sponge is used to clean the surface of the glass lid. In glass lid holes, a cotton swab can be used to remove the grease. A jet of tap water can be applied to clean and rinse the inside of the support leg hinge mechanism. Finally, all parts of the pan lid are removed and put them in the dishwasher and are rinsed well and dry.

In another embodiment of cleaning the pan lid 100, it is preferred to avoid excessively harsh cleaners and chemicals like alcohol. These formulas could remove the oleophobic coating off the protector, making it much less pleasant to use. Scrubbing with abrasive materials is prevented.

In one embodiment of disinfecting a new pan lid disclosed herein, it is preferred to prepare a mixture of hot water, ¼ cup of vinegar a mild soap. The pot and/or pans in this mixture can be washed, using a sponge or cloth. Each piece may be washed to remove any traces of manufacturing oil. 3. Rinse can be performed with the same sponge and plenty of water.

In one embodiment of removing grease from plastic and silicone parts of a pan lid disclosed herein, a mild detergent or soap and water can be used to remove grease and dirt from plastic surfaces such as polycarbonate, polyethylene, polystyrene, and ABS. Harsh chemicals or abrasive cleaners may be avoided, as they can damage the plastic.

Figure 4:
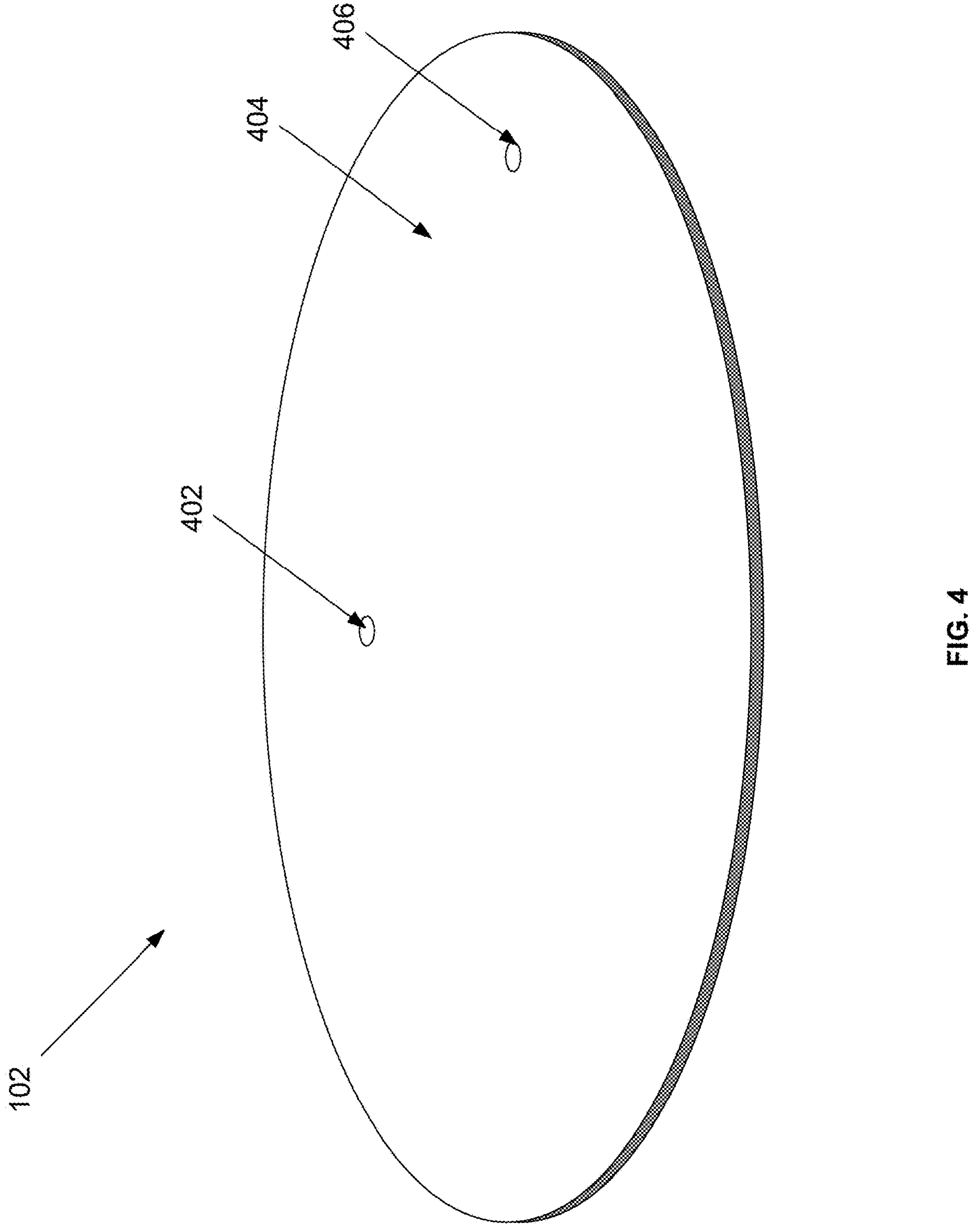
FIG. 4 illustrates a liquid cover unit (LCU) of the pan lid in FIG. 1 according to an example embodiment.

FIG. 4 illustrates a liquid cover unit (LCU) 102 of the pan lid 100 in FIG. 1 according to an example embodiment. The LCU 102 can be round or concave in shape, and can be made of borosilicate glass. The LCU's geometric center can incorporate a mounting hole 402, through which the LHU 104 can be securely fixed to it. The LCU's external face (e.g., a LCU external concave face 404) can incorporate another hole 406 that can receive the LRU 114.

Figure 5:
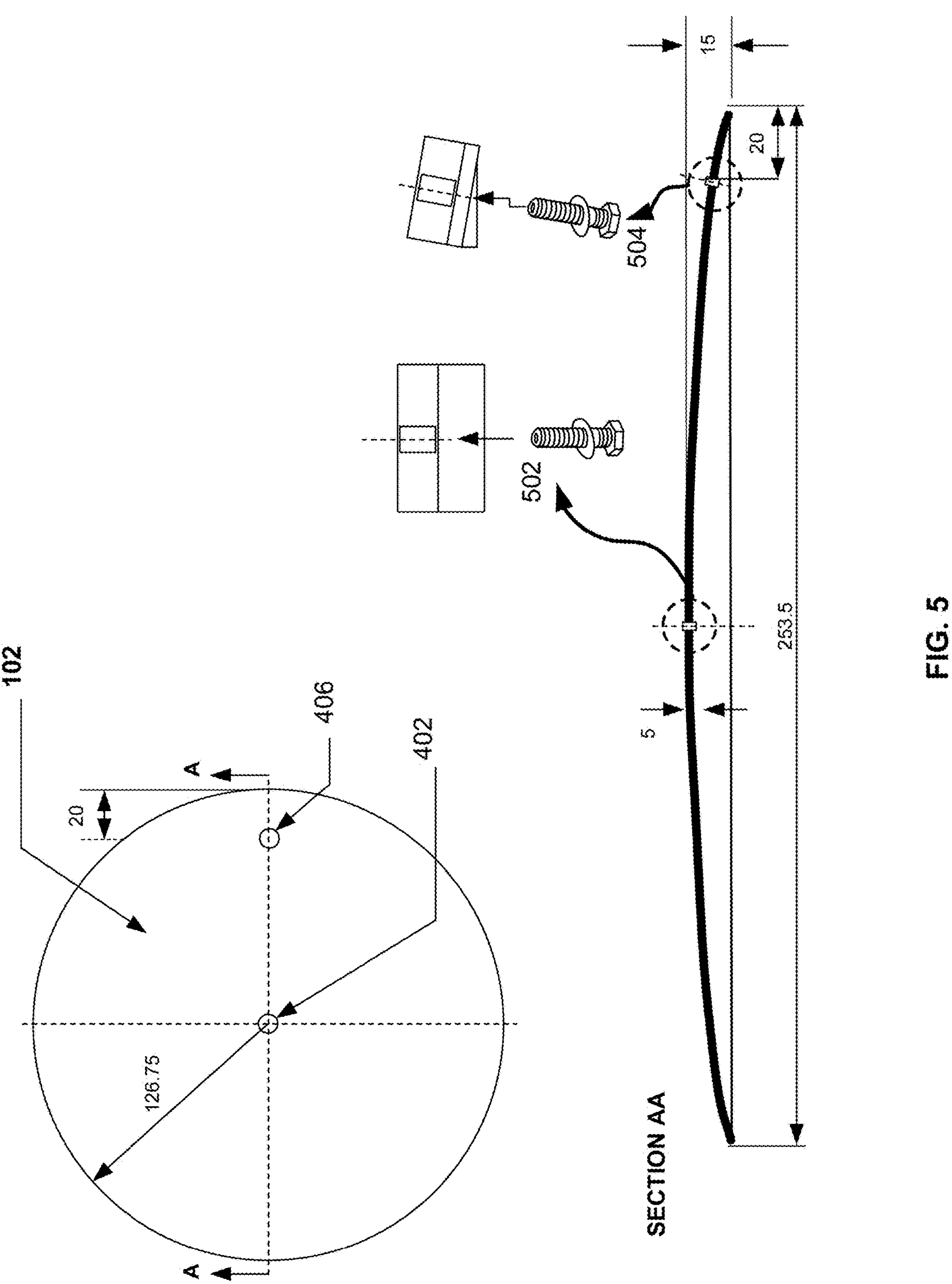
FIG. 5 illustrates details of the LCU with a cross section diagram that can show a concave shape of the LCU according to an example embodiment.

FIG. 5 further illustrates details of the LCU 102 with a cross section diagram that can show a concave shape of the LCU 102. The retainer base unit installation hole 406 is illustrated. The hinge assembly unit (HAU) installation hole 402 is also shown. The LCU 102 may have a radius of about 126.75 mm, and the distance from the center of the hole 406 to the edge of the LCU 102 may measure to be about 20 mm. As shown in the AA cross section diagram, the thickness of the LCU 102 may be about 5 mm and the vertical height of the LCU 102 can be about 15 mm. A bolt including a washer 502 may be used to secure the HAU 106 and/or the LHU 104 to the LCU 102, and a bolt including a washer 504 may be used to secure LRU 114 to the LCU 102. The LCU 102 can be made of tempered glass, which can be toughened, making it resistant to heat and hardly brittle. The bolts/washers 502 and 504 can be cap bolts with flat washers made of stainless steel. The thread design of bolts 502 and 504 can be deep thread design, for example, a size: M3×15 mm.

Figure 6:
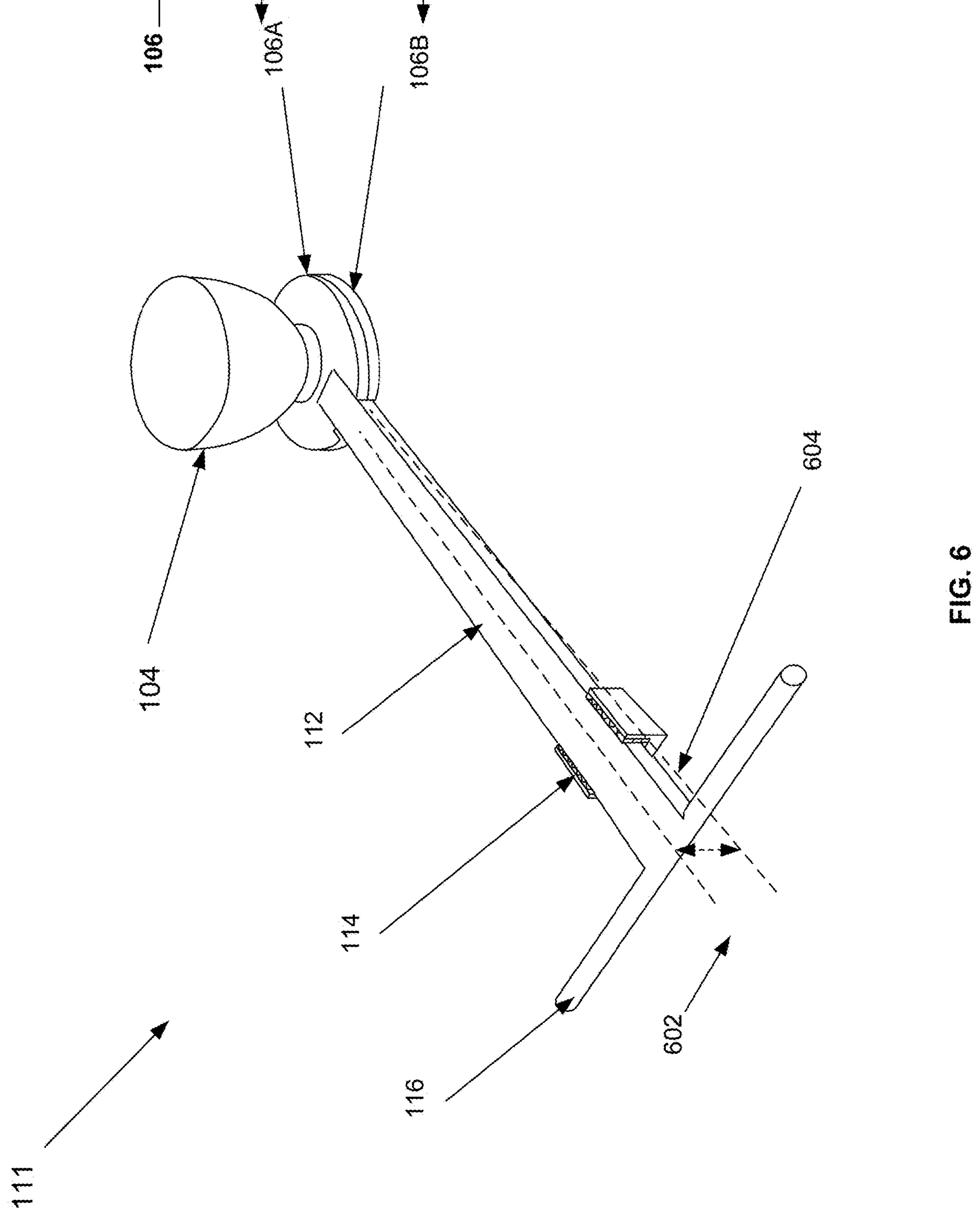
FIG. 6 illustrates a self-standing device (SSD) of the pan lid in FIG. 1 according to an example embodiment.

FIG. 6 illustrates a self-standing device (SSD) 111 of the pan lid 100 in FIG. 1 according to an example embodiment. As can be seen, the SSD 111 can comprise a LRU 114, a SLU 112, an ARU 116, a LHU 104 and a HAU 106 including a HPU 106A and a HBU 106B. The LHU 104 and HPU 106A may constitute a single physical component but each perform different functions. Also shown in the FIG. 6, a SLU center line 602 is parallel to countertop plane when the pan lid 100 rests flat on countertop. The LCU curvature 604 illustrates the LCU curves with respect to the SLU center line 602.

Figure 7:
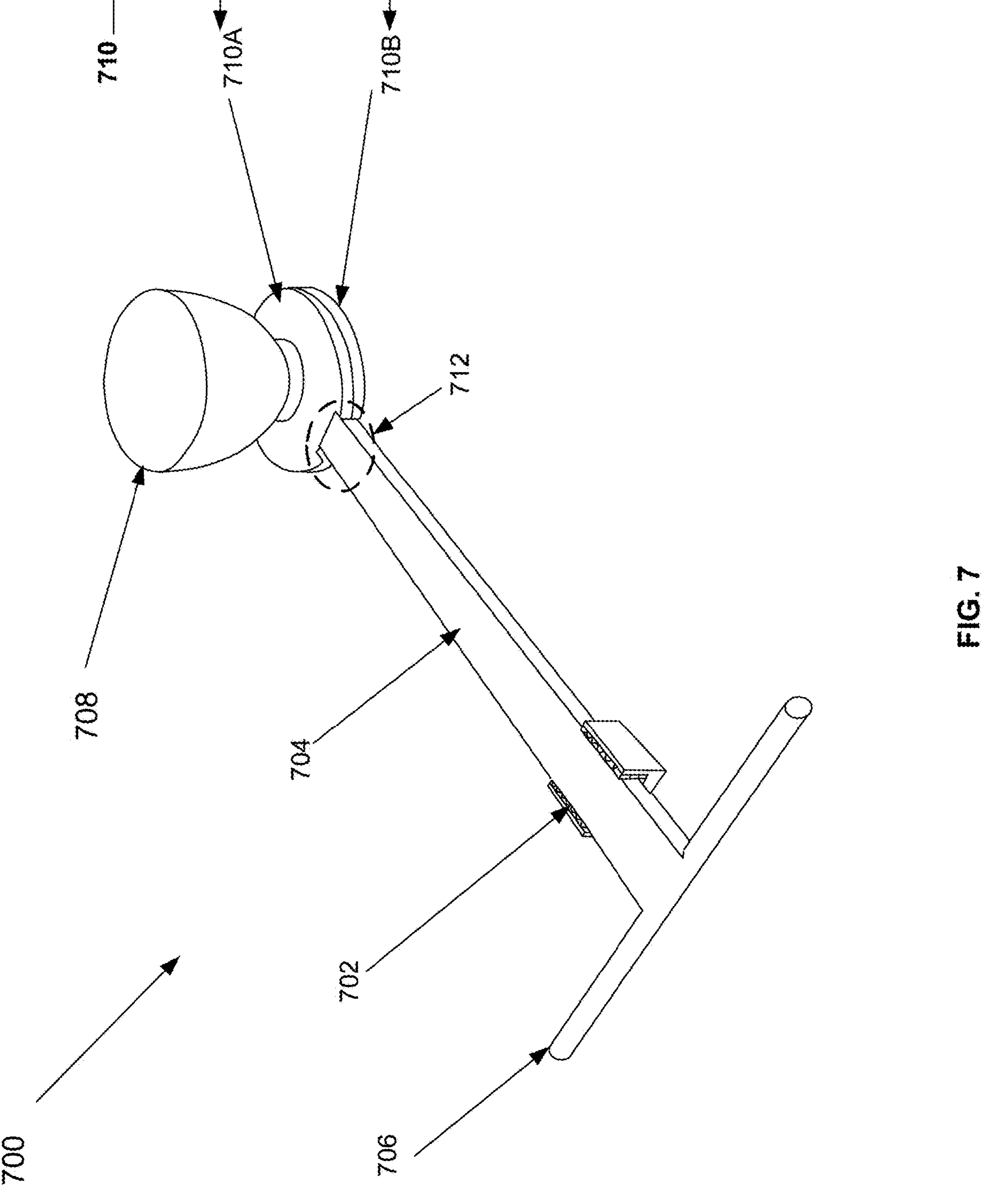
FIG. 7 illustrates another SSD of the pan lid in FIG. 1 according to an example embodiment.

FIG. 7 illustrates another SSD 700 that can be used for the pan lid 100 in FIG. 1 according to an example embodiment. As can be seen, the SSD 700 can comprise a LRU 702, a SLU 704, an ARU 706, a LHU 708 and a HAU 710 including a HPU 710A and a HBU 710B. The LHU 708 and HPU 710A may constitute a single physical component but each perform different functions. One difference of the SSD 700 from the SSD 111 shown in the FIG. 6, is the SLU 704 is received into the HPU 710A and the HBU 710B, as indicated by the dotted circle 712.

Figure 8:
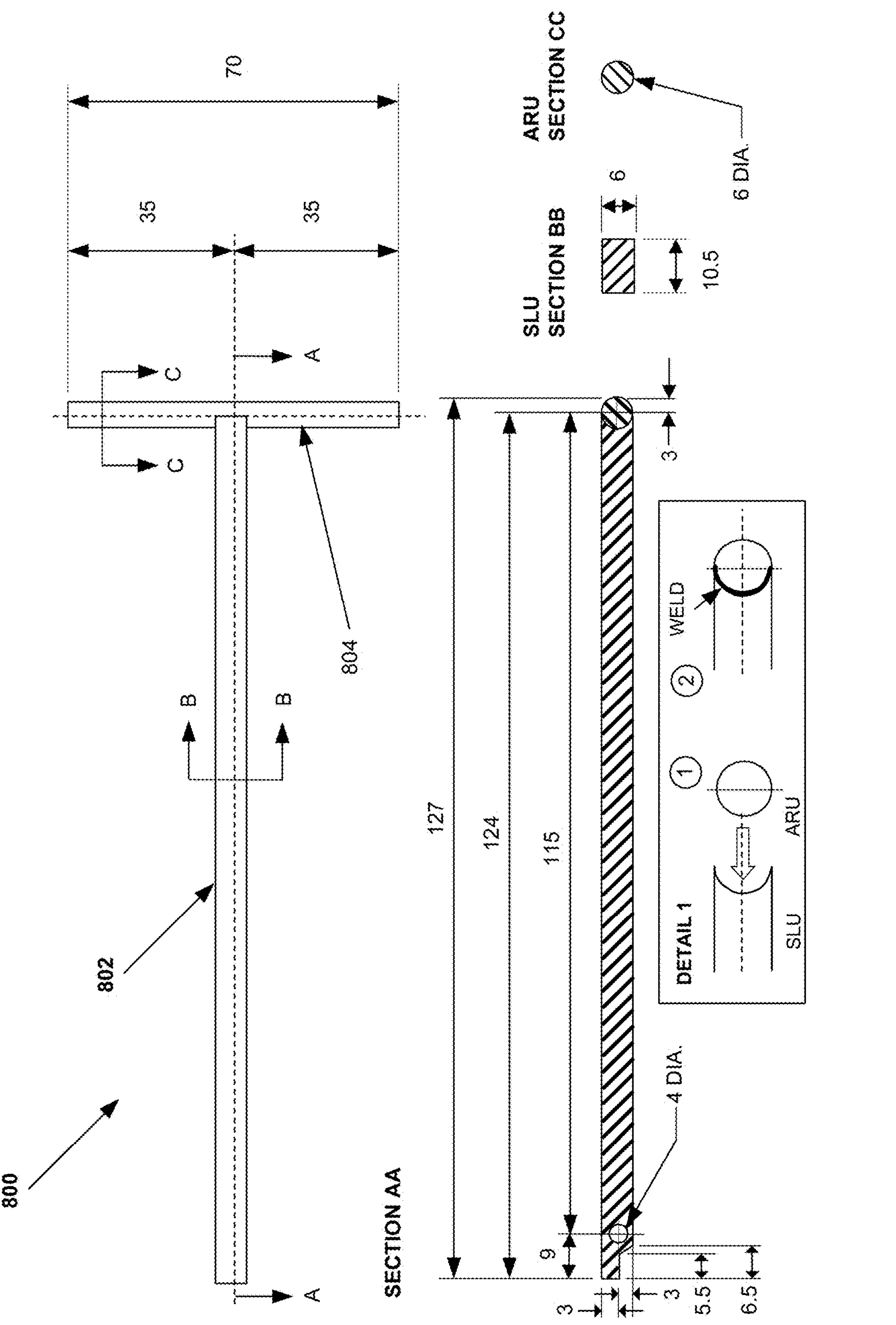
FIG. 8 illustrates a support leg assembly (SLA) that can be used for the pan lid in FIG. 1 according to an example embodiment.

FIG. 8 illustrates a support leg assembly (SLA) 800 including a SLU and ARU that can be used for the pan lid 100 in FIG. 1 according to an example embodiment. The SLA 800 can comprise a SLU 802 and an ARU 804. The SLU 802 and ARU 804 can be two separate pieces and joined together. The ARU 804 can measure to be about 70 mm long and have a diameter of about 6 mm, as shown in the cross section CC diagram. The SLU 802 can have a length of about 127 mm, a height of about 6 mm and a width of about 10.5 mm as shown in the cross section AA diagram and the cross section BB diagram. The unit of the other dimensions shown in FIG. 8 is also mm (millimeter). The SLU 802 and ARU 804 can be made of materials including, for example, 18/10 stainless steel. The SLU 802 and ARU 804 can have a finish of being smooth, reflective, and bright, including weld. The SLU 802 and ARU 804 can be joined together by, for example, welding as shown in DETAIL 1 in FIG. 8.

Figure 9:
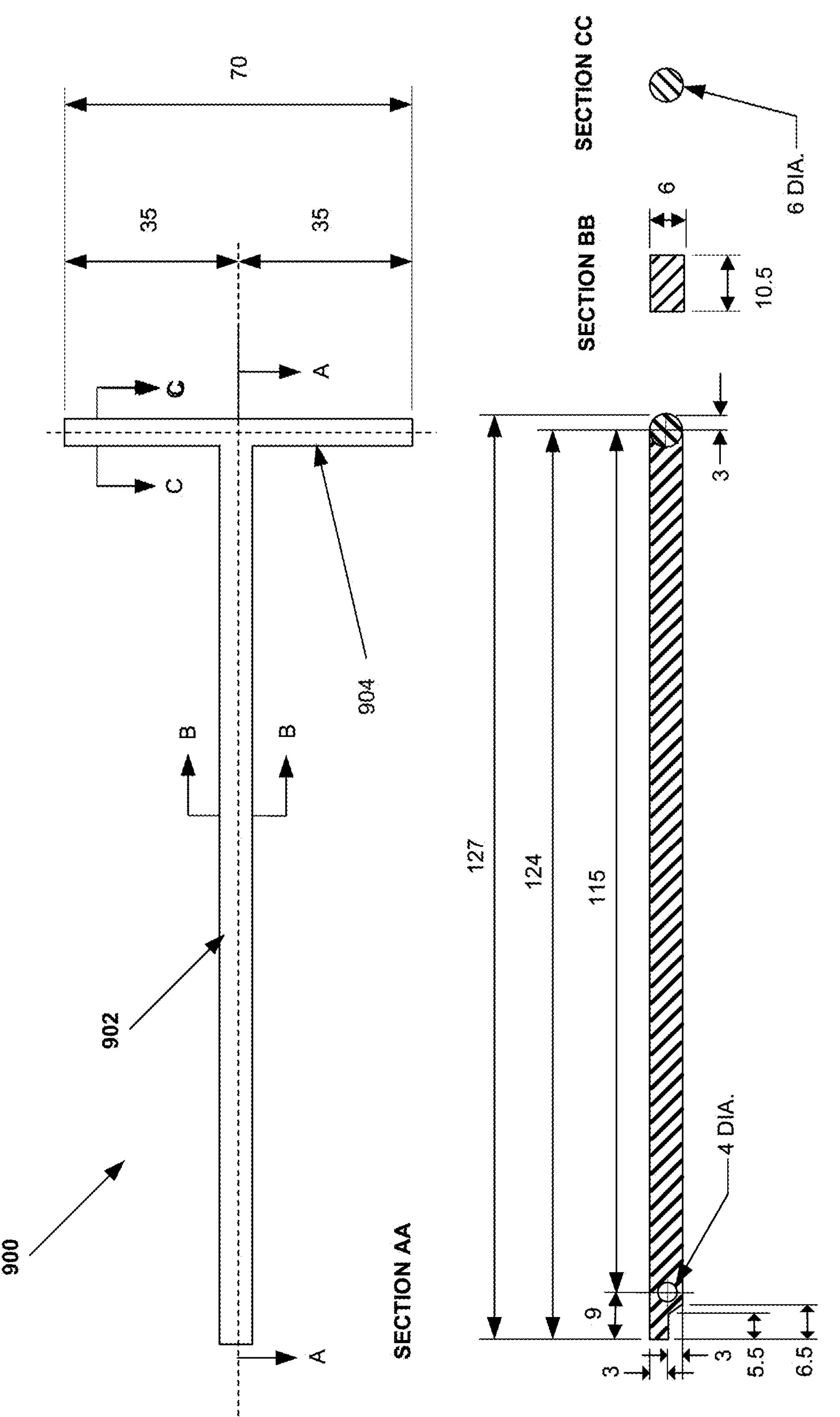
FIG. 9 illustrates another support leg assembly (SLA) that can be used for the pan lid 100 in FIG. 1 according to an example embodiment.

FIG. 9 illustrates another support leg assembly (SLA) 900 including a SLU and ARU that can be used for the pan lid 100 in FIG. 1 according to an example embodiment. The SLA 900 can comprise a SLU 902 and an ARU 904. The SLU 902 and ARU 904 can be one integral piece instead of two separate pieces joined together. The ARU 904 can measure to be about 70 mm long and have a diameter of about 6 mm, as shown in the cross section CC diagram. The SLU 902 can have a length of about 127 mm, a height of about 6 mm and a width of about 10.5 mm as shown in the cross section AA diagram and the cross section BB diagram. The unit of the other dimensions shown in FIG. 9 is also mm (millimeter). The SLU 902 and ARU 904 can be made of materials including, for example, 18/10 stainless steel. The SLU 902 and ARU 904 can have a finish of being smooth, reflective, and bright. The SLU 902 and ARU 904 can be fabricated in one piece component to form the SLA 900.

Figure 10:
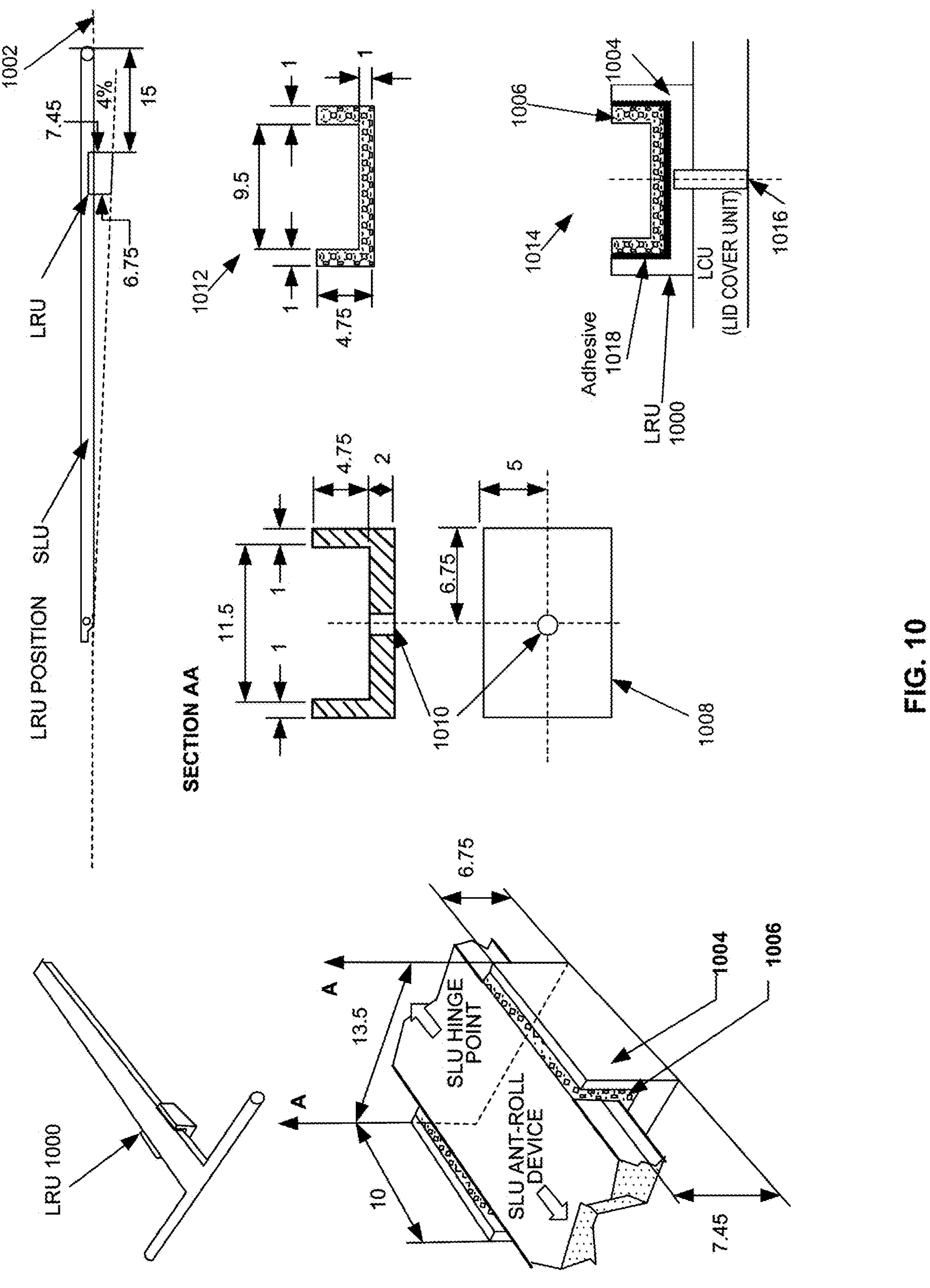
FIG. 10 illustrates a leg retainer unit (LRU) that can be used for the pan lid in FIG. 1 according to an example embodiment.

FIG. 10 illustrates a leg retainer unit (LRU) 1000 that can be used for the pan lid 100 in FIG. 1 according to an example embodiment. As can be seen in FIG. 10, the LRU 1000 can be horizontal plan when the pan lid is resting flat on countertop, as indicated by the dotted line 1002. The LRU 1000 may comprise a retaining plastic base (RPB) 1004 and a retaining silicone pad (RSP) 1006 that is received by the RPB 1004. The RPB 1004 can be made of materials, for example, plastic with high resistance to high temperature (e.g., <200° C.) and humidity. The RSP 1006 can be made of materials that are flexible and high resistance to high temperature (e.g., >200° C.) and humidity. As shown in the cross section AA diagram and its top view diagram 1008, the RPB 1004 can have a fitting hole 1010 which may be a through hole having a diameter of about 3 mm. The hole 1010 can be used for coupling the LRU 1000 to the LCU of the pan lid, as shown in the diagram 1014. The LCU may have an installation hole 1016 of about 3 mm diameter that matches with the hole 1010 of the RPB 1004. The diagram 1012 shows a side views of the RPB 1004. The RPB1004 and RSP 1006 parts can be glued together as shown by means of an industrial adhesive 1018 resistant to high temperature (e.g., >200° C.) and humidity. All dimensions in FIG. 10 are in the unit of mm.

Figure 11:
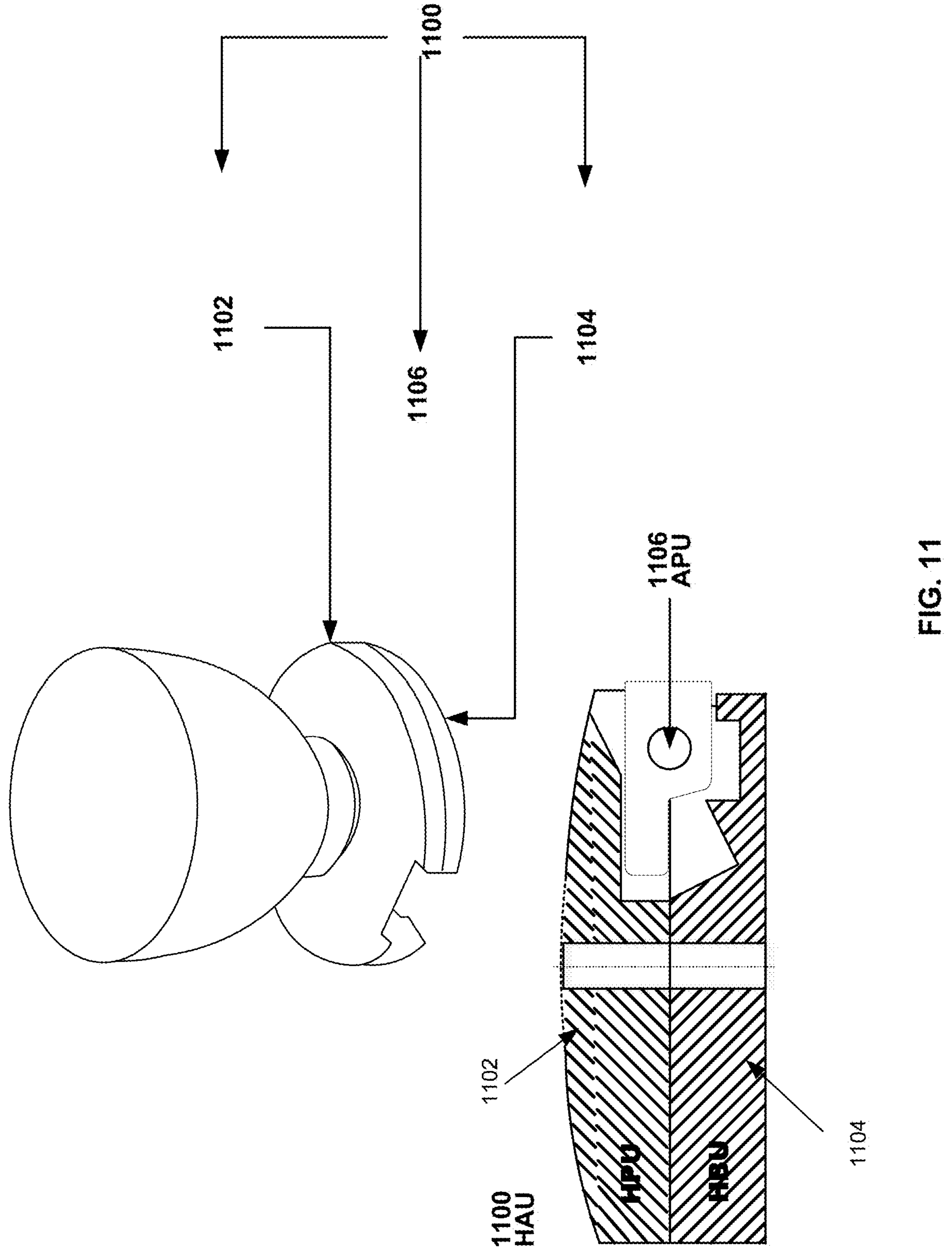
FIG. 11 illustrates a hinge assembly unit (HAU) that can be used for the pan lid in FIG. 1 according to an example embodiment.

FIG. 11 illustrates a hinge assembly unit (HAU) 1100 that can be used for the pan lid 100 in FIG. 1 according to an example embodiment. The HAU 1100 may comprise a HPU 1102, a HBU 1104 and an APU 1106. The HAU 1100 can be made of high quality plastic with high resistance to high temperatures (e.g., <200° C.) and levels of humidity. The APU can be made of 10/18 stainless steel.

Figure 12:
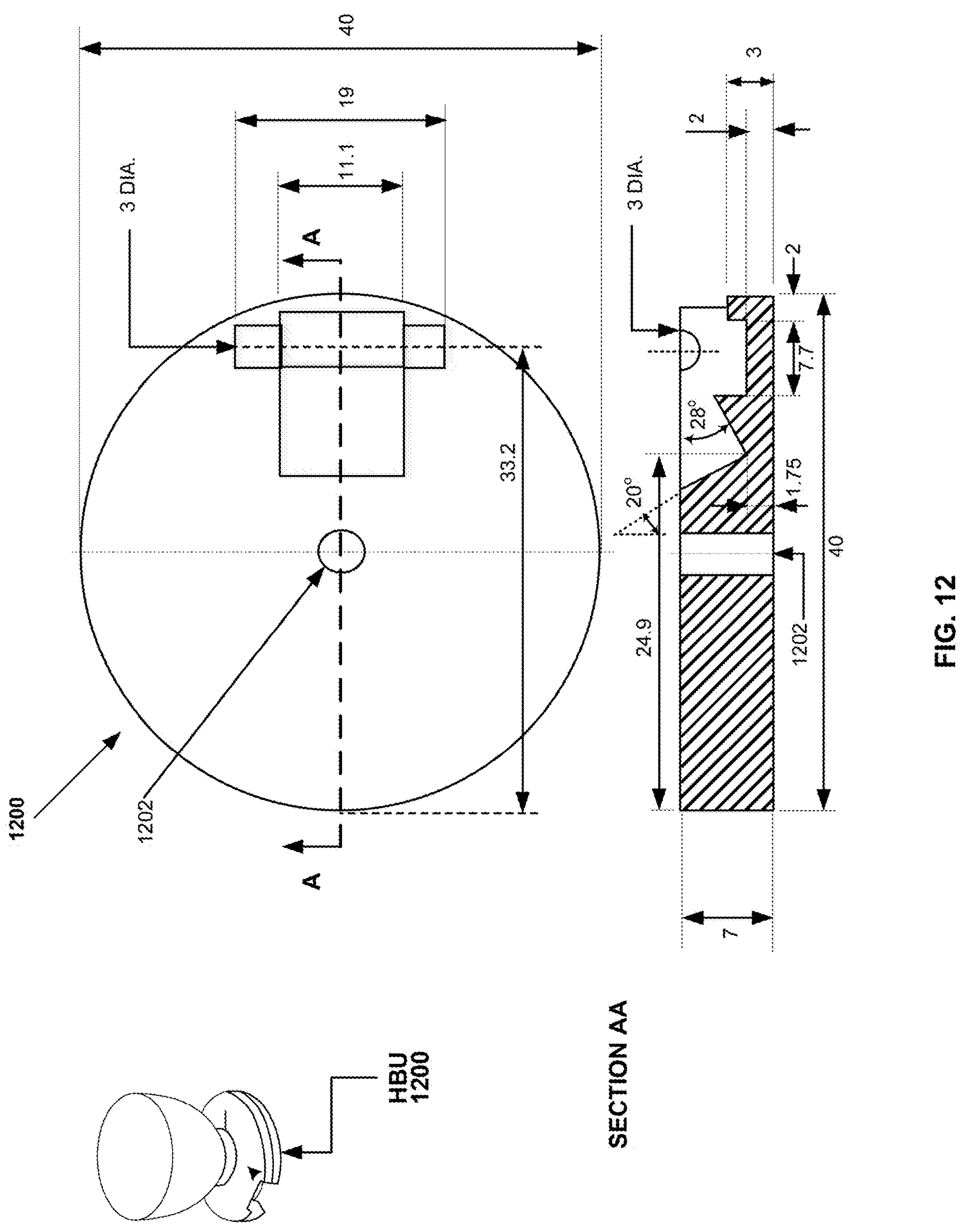
FIG. 12 illustrates a hinge base unit (HBU) that can be used for the pan lid in FIG. 1 according to an example embodiment.

FIG. 12 illustrates a hinge base unit (HBU) 1200 that can be used for the pan lid 100 in FIG. 1 according to an example embodiment. The HBU 1200 may be provided with a through hole 1202, for example, a threaded hole with a diameter of about 3 mm. As shown in the cross section AA diagram, the HBU 1200 may have a thickness of about 7 mm. All dimensions in FIG. 12 are in the unit of mm.

Figure 13:
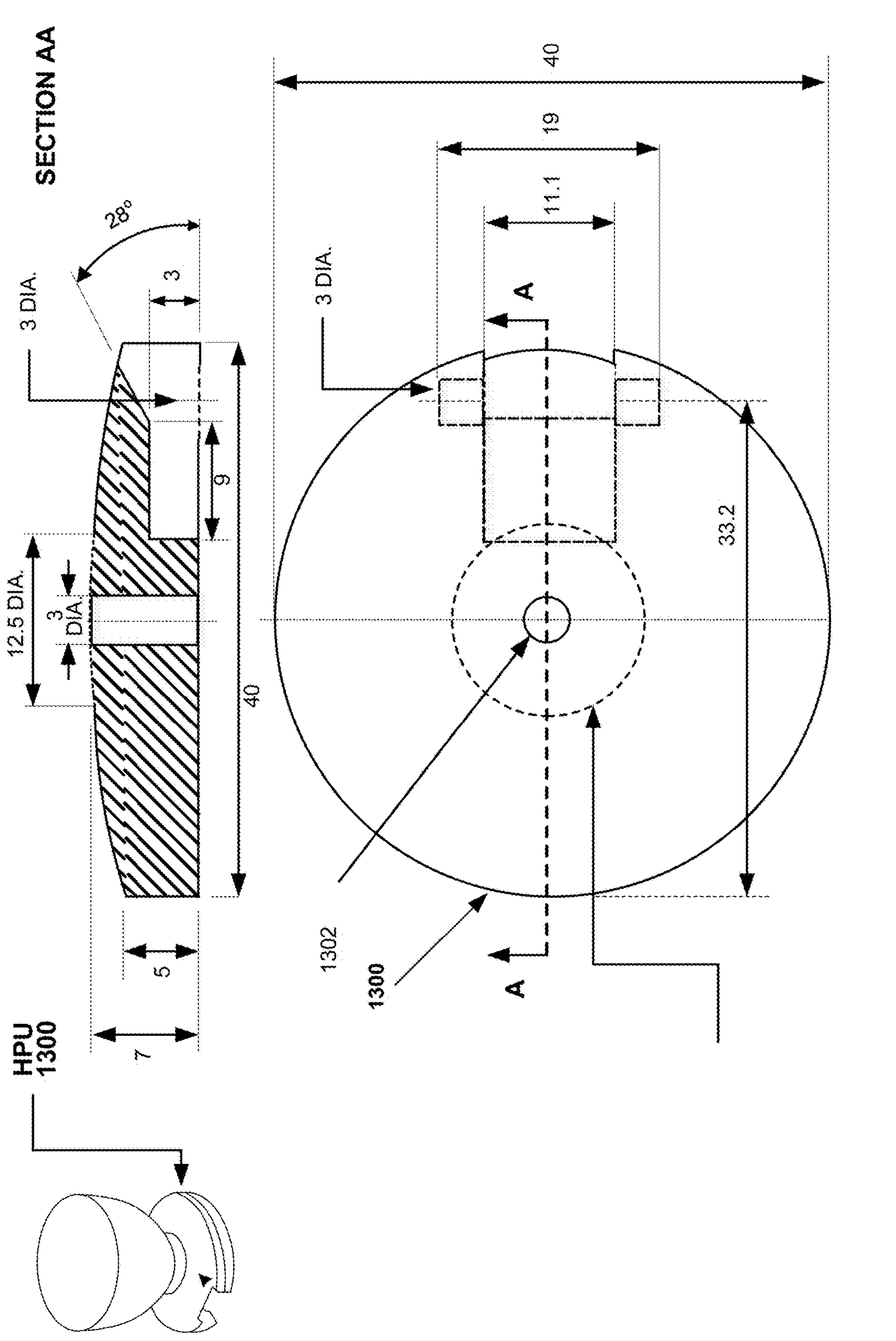
FIG. 13 illustrates a hinge plate unit (HPU) that can be used for the pan lid in FIG. 1 according to an example embodiment.

FIG. 13 illustrates a hinge plate unit (HPU) 1300 that can be used for the pan lid 100 in FIG. 1 according to an example embodiment. The HPU 1300 may be provided with a through hole 1302, for example, a threaded hole with a diameter of about 3 mm. The hole 1302 can be aligned with the hole 1202. As described, the LHU and HBU can constitute a single physical component, but each performs different functions. All dimensions in FIG. 13 are in the unit of mm.

Figure 14:
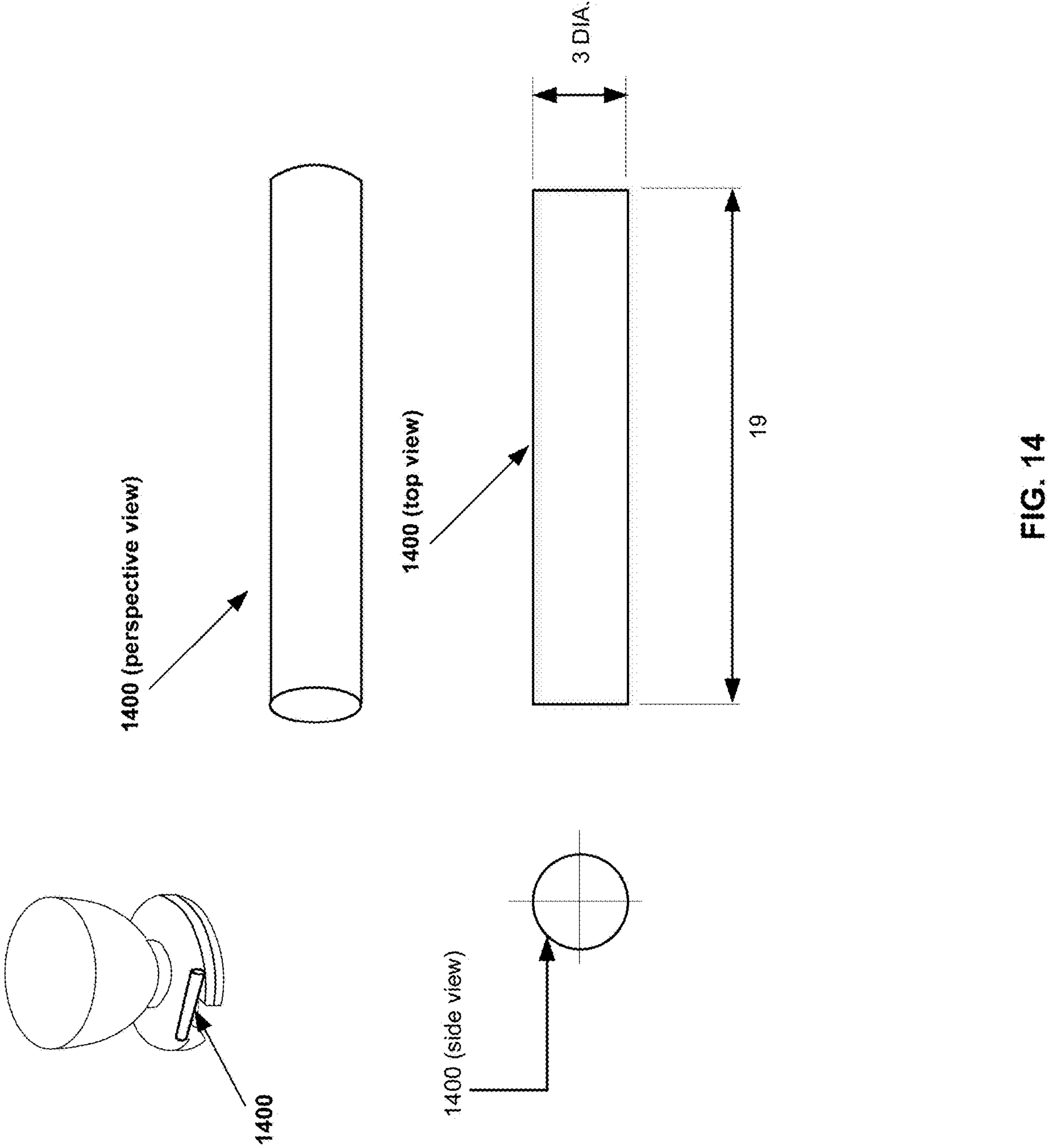
FIG. 14 illustrates an axle pin unit (APU) that can be used for the pan lid in FIG. 1 according to an example embodiment.

FIG. 14 illustrates an axle pin unit (APU) 1400 that can be used for the pan lid 100 in FIG. 1 according to an example embodiment. FIG. 14 shows different view diagrams of the APU 1400. The APU 1400 can be a cylindrical shape having a diameter of about 3 mm and a length of about 19 mm. All dimensions in FIG. 14 are in the unit of mm.

Figure 15:
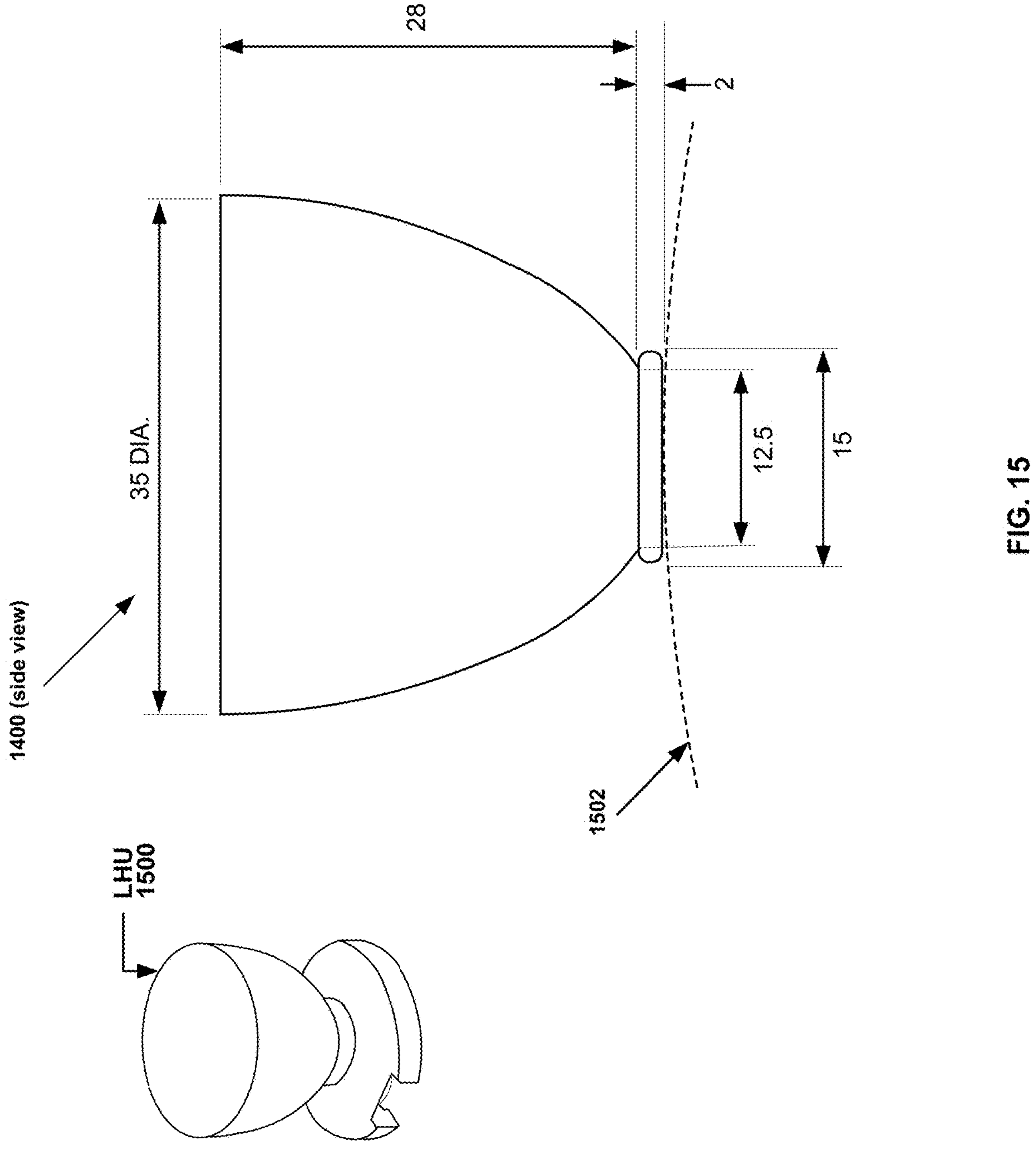
FIG. 15 illustrates lid holder unit (LHU) that can be used for the pan lid in FIG. 1 according to an example embodiment.

FIG. 15 illustrates lid holder unit (LHU) 1500 that can be used for the pan lid 100 in FIG. 1 according to an example embodiment. The LHU 1500 may be configured to have a bowl shape having a flat surface of about 23 mm in diameter and a total height of about 30 mm. All dimensions in FIG. 15 are in the unit of mm. The HPU (hinge plate unit) and the LHU can constitute a single physical component but each perform different function. The dashed line 1502 indicates a top profile of the lid cover unit (LCU).

Figure 16:
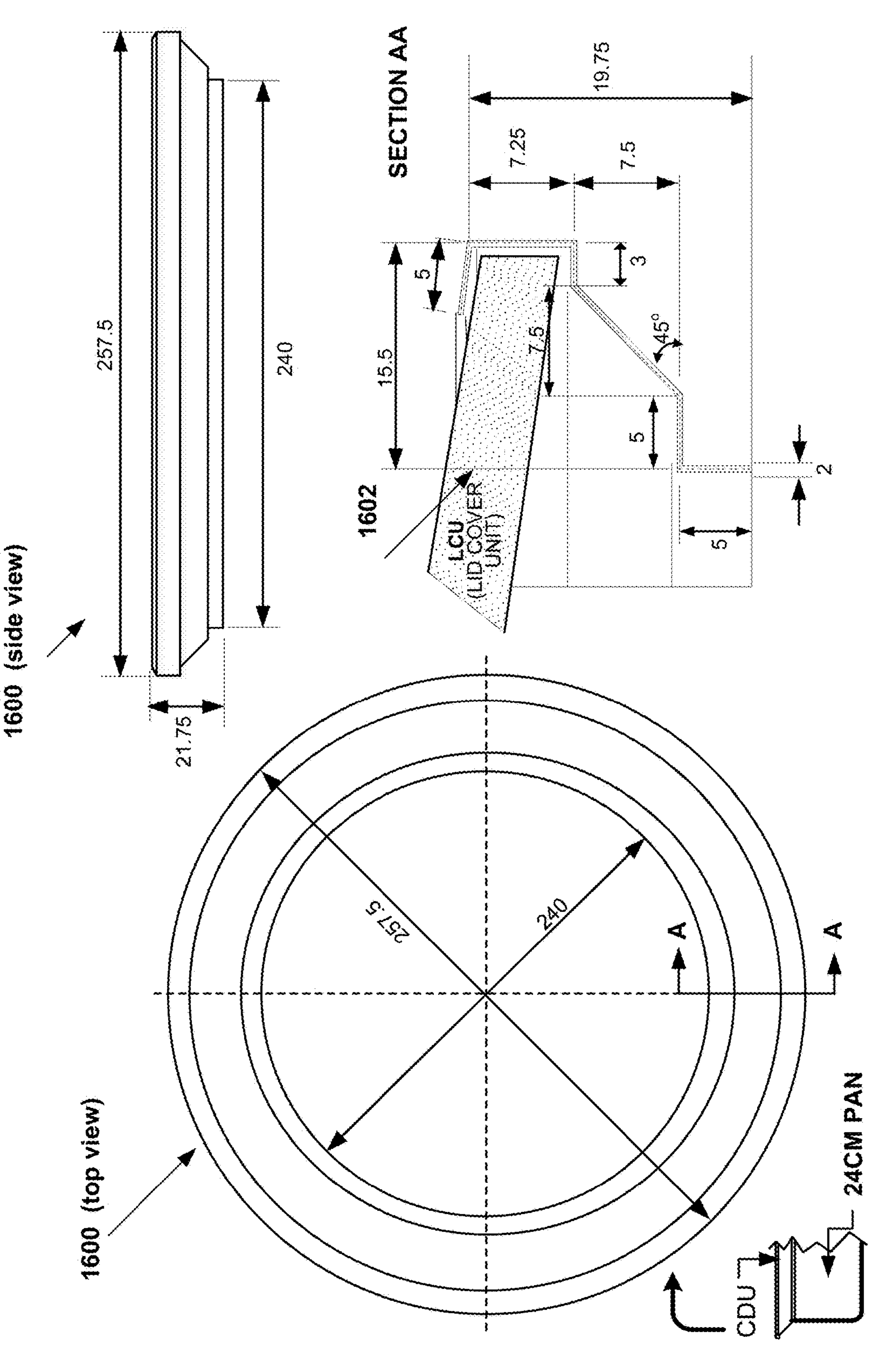
FIG. 16 illustrates condensation disposal unit (CDU) that can be used for the pan lid in FIG. 1 according to an example embodiment.

FIG. 16 illustrates condensation disposal unit (CDU) 1600 that can be used for the pan lid 100 in FIG. 1 according to an example embodiment. FIG. 16 shows different view diagrams of the CDU 1600. All dimensions in FIG. 16 are in the unit of mm. As shown in the cross section AA diagram, the CDU 1600 can be coupled with a LCU 1602. Also shown in FIG. 16, the CDU 1600 can fit into a 24 cm diameter pan. The CDU 1600 can be made of materials, such as 18/10 stainless steel, to provide a smooth, reflective, and bright finish.

The CDU can be configured to collect condensation accumulated on the inside face of the LCU when the pan lid 100 is rotated to a vertical position when removed from a pan, and to dispose of the accumulated liquid into a sink without dripping onto a kitchen countertop. The CDU can be configured to have the shape of a ring that is firmly fixed to the LCU by a longer (upper) diameter and rests on a pan by a shorter (lower) diameter. When the CDU is rotated, the collected condensation can be accumulated between the LCU and the CDU.

The pan lid 100 can be a glass lid that can be used with all types of pans, such as saucepans, casseroles, pots, etc. The pan lid 100 can allow checking the cooking and cooking point of recipes at all times and without altering it. The pan lid 100 can prevent splashes and achieve excellent results in the kitchen. And, above all, due to its unique design, when the pan lid 100 is removed from the pan, it can collect the condensation on its internal face and can be placed firmly on the kitchen countertop, avoiding any dripping on the kitchen countertop. The pan lid 100 can offer safer and cleaner performance than existing pan lids.

The pan lid 100 can be manufactured in the most widely used standard sizes. The pan lid 100 can be made of glass resistant to high temperatures with a stainless steel edge, dishwasher safe and scratch resistant. The material used can be borosilicate glass, whose main advantages can include: resistance to high temperatures, (e.g., from about −40° C. up to about +300° C.); extreme resistance to thermal shocks (e.g., greater than 220° C.), being able to go from about −20° C. in a freezer to about 200° C. in an oven; and being the most hygienic material that does not retain odors or flavors, free of BPA (Bisphenol-A).

The pan lid 100 can be produced in sizes to fit pan standard sizes of such as 14 cm (5.51"), 16 cm (6.30"), 18 cm (7.08"), 20 cm (7.87"), 22 cm (8.66"), 24 cm (9.45"), 26 cm (10.24"), 28 cm (11.02"), 30 cm (11.81"), 32 cm (12.60") and 34 cm (13.38") in diameter.

The LHU can be made of high quality plastic, which can be strong and durable, high temperature resistant, friction resistant, waterproof, corrosion resistant and easy to clean. The plastic can also non-slip, anti-scald, fit comfortably in the hand, and resistant to drops. The LHU can be configured to protect the hand of a holder from heat. The LHU can be non-stick, durable and heat resistant. The LHU can be dishwasher safe and easy to clean. The LHU can be replaceable and easy to install. Stainless steel screw and washer can be used to attach and fix the LHU to the LCD by threading the stainless steel screw and washer into the threaded hole.

The pan lid disclosed herein can be configured to perform the following functions when removing it from a pan during cooking: collecting the condensation accumulated on the inside of LCU; retaining collected condensation without dripping from LCU onto the kitchen countertop; and allowing the process of pouring the condensation into the sink to be easy and clean.

When the pan lid is removed from a pan and flipped from the horizontal to the vertical position, it can cause the CDU to collect and retain condensation on the bottom edge of LCU. When the pan lid 100 is placed in a substantially vertical position, the CDU can collect and retain condensation.

The performance of the pan lid disclosed herein can be a function of a number of variables, for example: pan lid size referenced to pan size it fits, measured on the inside diameter of CDU lower edge; pan lid tilt angle when resting on the countertop; CDU height; and CDU tilt angle with respect to the pan lid. The example pan lid can have a size fitting a 300 mm (11.81") pan. The example pan lid can tilt at an upright position of about 70°. The example pan lid can have a retaining capacity up to 10 ml (0.34 Fl. Oz.)

In some embodiments of the present disclosure, the LHU can be made of plastic. The LCU can be made of tempered glass. The tempered glass is toughened, making it resistant to heat and hardly brittle. The USU can be made of stainless steel. The CDU can be made of stainless steel. For example, the stainless steel can be high-quality 18/10 stainless steel, made up of an alloy of 18% chromium and 10% nickel.

In summary, the present invention relates to a condensation remover self-standing pan lid. The lid includes a lid cover unit, a collection and disposal unit, a lid holder unit, and a self-standing unit. The lid cover unit is designed to fit securely on top of a pan, preventing condensation from escaping. The collection and disposal unit collects the condensed liquid and provides a means for easy disposal. The lid holder unit allows the lid to be conveniently stored when not in use. The self-standing unit ensures stability and prevents the lid from tipping over. This innovative self-standing pan lid provides an efficient and practical solution for removing condensation during cooking, enhancing the overall cooking experience.

In some aspects, the techniques described herein relate to a condensation remover self-standing pan lid, including: a lid cover unit; a collection and disposal unit coupled to the lid cover unit; a lid holder unit coupled to the lid cover unit; and a self-standing unit coupled to the lid holder unit and the lid cover unit.

In some aspects, the techniques described herein relate to a condensation remover self-standing pan lid, wherein the lid cover unit is round and concave in shape, and is made of tempered glass.

In some aspects, the techniques described herein relate to a condensation remover self-standing pan lid, wherein the lid cover unit includes a hole at a geometric center of the lid cover unit through which the lid holder unit is coupled to the lid cover unit.

In some aspects, the techniques described herein relate to a condensation remover self-standing pan lid, wherein the self-standing unit includes a hinge assembly unit through which the self-standing unit is coupled to the lid holder unit and the lid cover unit.

In some aspects, the techniques described herein relate to a condensation remover self-standing pan lid, wherein the hinge assembly unit includes a hinge plate unit and a hinge base unit.

In some aspects, the techniques described herein relate to a condensation remover self-standing pan lid, wherein the hinge assembly unit includes an axle pin unit and a supporting leg unit, the support leg unit being coupled to the hinge plate unit and the hinge base unit through the axle pin unit.

In some aspects, the techniques described herein relate to a condensation remover self-standing pan lid, wherein the hinge assembly unit includes a leg retainer unit, the support leg unit being received by the leg retainer unit when the support leg unit is retracted.

In some aspects, the techniques described herein relate to a condensation remover self-standing pan lid, wherein the leg retainer unit includes a retaining silicone pad contacting the support leg unit and a retaining plastic base surrounding the retaining silicone pad.

In some aspects, the techniques described herein relate to a condensation remover self-standing pan lid, wherein the leg retainer unit includes an adhesive layer located between the retaining silicone pad and the retaining plastic to join the retaining silicone pad and the retaining plastic together.

In some aspects, the techniques described herein relate to a condensation remover self-standing pan lid, wherein the axle pin unit is configured to have a cylindrical shape.

In some aspects, the techniques described herein relate to a condensation remover self-standing pan lid, wherein the lid cover unit includes a hole at an edge position of the lid cover unit through which the axle pin unit is coupled to the lid cover.

In some aspects, the techniques described herein relate to a condensation remover self-standing pan lid, wherein the leg supporting unit is configured to tilt an angle with respect to the lid cover unit.

In some aspects, the techniques described herein relate to a condensation remover self-standing pan lid, wherein the collection and disposal unit is configured to collect condensation accumulated on an inside face of the lid cover unit when the condensation remover self-standing pan lid is rotated to a vertical position, and to dispose of the collected condensation into a sink without dripping onto a countertop.

In some aspects, the techniques described herein relate to a condensation remover self-standing pan lid, wherein the collection and disposal unit has a shape of a ring that is firmly fixed to the lid cover unit by an upper diameter and rests on a pan by a lower diameter.

In some aspects, the techniques described herein relate to a condensation remover self-standing pan lid, wherein the collection and disposal unit is made of stainless steel.

In some aspects, the techniques described herein relate to a condensation remover self-standing pan lid, wherein the lid holder unit is made of plastic.

In some aspects, the techniques described herein relate to a condensation remover self-standing pan lid, wherein the lid holder unit is non-stick, durable and heat resistant, protecting a hand from heat.

In some aspects, the techniques described herein relate to a condensation remover self-standing pan lid, wherein the lid holder unit includes an internal thread through which the lid holder unit is coupled to the lid cover unit by threading a screw into the internal thread.

In some aspects, the techniques described herein relate to a cooking apparatus including: a pan; and a condensation remover self-standing pan lid fitting securely on top of the pan, wherein the condensation remover self-standing pan lid includes: a lid cover unit; a collection and disposal unit coupled to the lid cover unit; a lid holder unit coupled to the lid cover unit; and a self-standing unit coupled to the lid holder unit and the lid cover unit.

In some aspects, the techniques described herein relate to a cooking apparatus, wherein the condensation remover self-standing pan lid fits securely on top of the pan through the collection and disposal unit.

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A condensation remover self-standing pan lid, comprising:

a lid cover unit;

a collection and disposal unit coupled to the lid cover unit;

a lid holder unit coupled to the lid cover unit; and a self-standing unit coupled to the lid holder unit and the lid cover unit, wherein the self-standing unit including a supporting leg unit configured to be released from a retracted position and to rotate outward from the lid cover unit when the pan lid is rotated to a vertical position, thereby supporting the pan lid in a substantially upright position on a surface, and wherein the collection and disposal unit has a shape of a ring that is fixed to the lid cover unit by an upper diameter and rests on a pan by a lower diameter.

2. The condensation remover self-standing pan lid according to claim 1, wherein the lid cover unit is round and concave in shape, and is made of tempered glass.

3. The condensation remover self-standing pan lid according to claim 1, wherein the lid cover unit includes a hole at a geometric center of the lid cover unit through which the lid holder unit is coupled to the lid cover unit.

4. The condensation remover self-standing pan lid according to claim 1, wherein the self-standing unit includes a hinge assembly unit through which the self-standing unit is coupled to the lid holder unit and the lid cover unit.

5. The condensation remover self-standing pan lid according to claim 4, wherein the hinge assembly unit includes a hinge plate unit and a hinge base unit.

6. The condensation remover self-standing pan lid according to claim 4, wherein the hinge assembly unit includes an axle pin unit and the supporting leg unit, the supporting leg unit being coupled to the hinge plate unit and the hinge base unit through the axle pin unit.

7. The condensation remover self-standing pan lid according to claim 6, wherein the hinge assembly unit includes a leg retainer unit, the support leg unit being received by the leg retainer unit when the support leg unit is retracted.

8. The condensation remover self-standing pan lid according to claim 7, wherein the leg retainer unit comprises a retaining silicone pad contacting the support leg unit and a retaining plastic base surrounding the retaining silicone pad.

9. The condensation remover self-standing pan lid according to claim 8, wherein the leg retainer unit comprises an adhesive layer located between the retaining silicone pad and the retaining plastic to join the retaining silicone pad and the retaining plastic together.

10. The condensation remover self-standing pan lid according to claim 7, wherein the lid cover unit includes a hole at an edge position of the lid cover unit at which the leg retainer unit is coupled to the lid cover unit.

11. The condensation remover self-standing pan lid according to claim 6, wherein the axle pin unit is configured to have a cylindrical shape.

12. The condensation remover self-standing pan lid according to claim 6, wherein the supporting leg unit is configured to tilt an angle with respect to the lid cover unit.

13. The condensation remover self-standing pan lid according to claim 1, wherein the collection and disposal unit is configured to collect condensation accumulated on an inside face of the lid cover unit when the condensation remover self-standing pan lid is rotated to a vertical position, and to dispose of the collected condensation without dripping onto a surface.

14. The condensation remover self-standing pan lid according to claim 1, wherein the collection and disposal unit is made of stainless steel.

15. The condensation remover self-standing pan lid according to claim 1, wherein the lid holder unit is made of plastic.

16. The condensation remover self-standing pan lid according to claim 1, wherein the lid holder unit is non-stick, durable and heat resistant, protecting a hand from heat.

17. The condensation remover self-standing pan lid according to claim 1, wherein the lid holder unit includes an internal thread through which the lid holder unit is coupled to the lid cover unit by threading a screw into the internal thread.

18. A cooking apparatus comprising:

a pan; and a condensation remover self-standing pan lid fitting securely on top of the pan, wherein the condensation remover self-standing pan lid includes:

a lid cover unit;

a collection and disposal unit coupled to the lid cover unit;

a lid holder unit coupled to the lid cover unit; and a self-standing unit coupled to the lid holder unit and the lid cover unit, wherein the self-standing unit including a supporting leg unit configured to be released from a retracted position and to rotate outward from the lid cover unit when the pan lid is rotated to a vertical position, thereby supporting the pan lid in a substantially upright position on a surface, wherein the collection and disposal unit has a shape of a ring that is fixed to the lid cover unit by an upper diameter and rests on the pan by a lower diameter, and wherein the condensation remover self-standing pan lid fits securely on top of the pan through the collection and disposal unit.

* * * * *